Sept. 14, 1948.   J. H. CANTLIN   2,449,054
FLUID MASS MEASURING DEVICE
Filed July 21, 1945   2 Sheets-Sheet 1
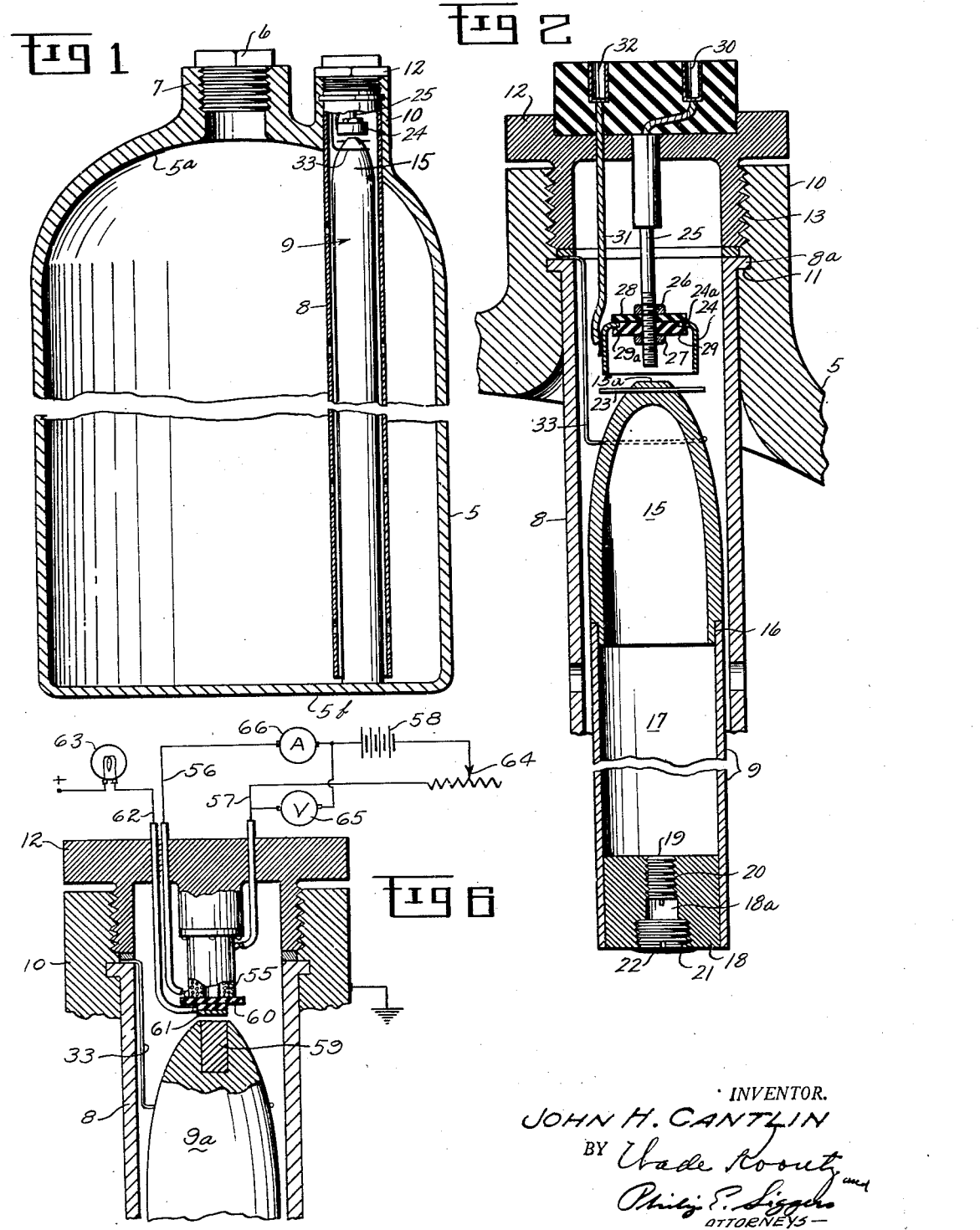
INVENTOR.
JOHN H. CANTLIN
BY
ATTORNEYS Sept. 14, 1948.  J. H. CANTLIN  2,449,054
FLUID MASS MEASURING DEVICE
Filed July 21, 1945  2 Sheets-Sheet 2
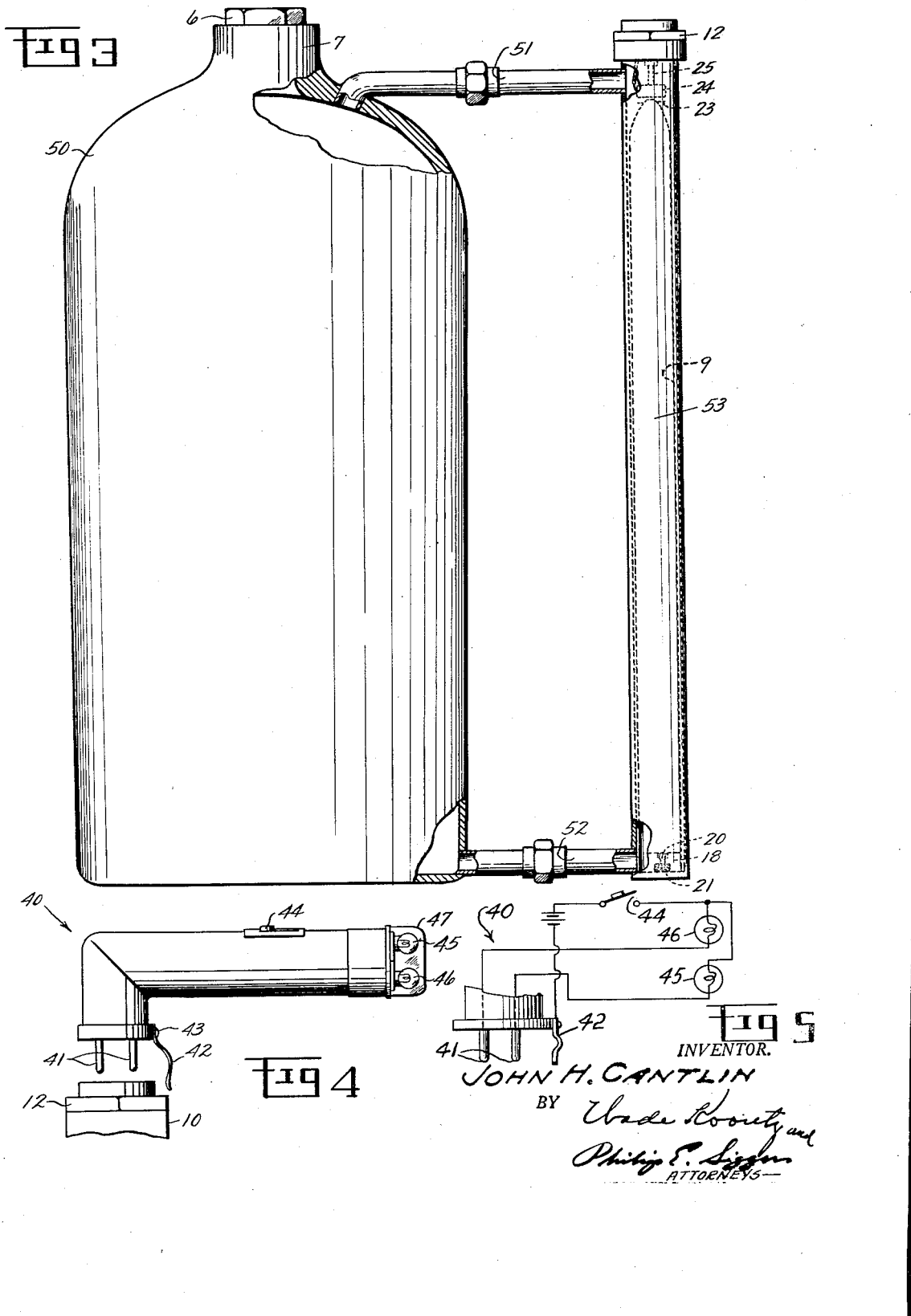

Patented Sept. 14, 1948

2,449,054

UNITED STATES PATENT OFFICE 2,449,054

FLUID MASS MEASURING DEVICE

John H. Cantlin, North Andover, Mass.

Application July 21, 1945, Serial No. 606,461

4 Claims. (Cl. 177—311)

(Granted under the act of March 3, 1883, as amended April 30, 1928; 370 O. G. 757)

The invention described herein may be manufactured and used by or for the Government for governmental purposes without payment to me of any royalty thereon.

This invention relates to apparatus for determining the weight of a compressed fluid in a closed container, without opening or weighing the container or even moving it.

Heretofore carbon dioxide, nitrous oxide and other fluids frequently stored in a liquid or partly liquid state have been confined in tanks, cylinders and bottles at high pressures, and the containers have then been stored away or installed in the systems of which they are a part, with no provision for determining the gas content of each container. Hence if a fire extinguishing system, for example, is to be checked prior to departure of the airplane or ship, all of the carbon dioxide containers must be removed from their installed positions and weighed, and those of less than the minimum weight must be replaced or recharged and restored to their original positions in the system. In a large ship, as many as 500 of the heavy metal cylinders used for carbon dioxide may have to be laboriously removed, weighed and replaced or recharged. The same process must be repeated for each carbon dioxide bottle used on aircraft. It is safe to say that many thousands of man-hours and much labor are expended each month in merely checking the weight of compressed gas containers.

It is the primary purpose of this invention to make it possible to weigh the gas in a container without opening the container or weighing it, and even, in certain instances, without handling the container. In one aspect of the invention, a novel container is provided having self-contained means for co-operating with a portable electrical indicating device which may be carried from one gas container to another and will give a signal or indication when the weight of the gas in any container is sufficient or insufficient or in excess of requirements. In another of its aspects, the invention provides a testing apparatus which may be attached to a conventional gas cylinder to weigh its contents without materially altering its construction. Another object is to provide fluid-weighing apparatus which will weigh the total amount of fluid in a closed container, whether the fluid be in a liquid or gaseous state, or in both states, though without weighing the container. A further object is to provide a fluid weighing or measuring device which operates independently of barometric pressure. Another object is to provide apparatus for weighing a fluid under pressure which operates at any temperature above the freezing point of the contained fluid. An additional object is to provide an apparatus which will weigh a compressed gas or vapor with a high degree of accuracy, without weighing the container. Further objects will be understood from the following description of two embodiments of the invention shown in the accompanying drawings, wherein—

Fig. 1 is a longitudinal section through a gas container with the improvement incorporated therein;

Fig. 2 is a fragmentary sectional elevation on an enlarged scale;

Fig. 3 is an elevation showing a compressed gas container of conventional construction with a gas-weighing device, which is a modified form of the invention, attached thereto by a pair of pipes;

Fig. 4 is an elevation of a portable testing unit which may be used with the forms of Figs. 1 and 3;

Fig. 5 is a wiring diagram of the elements within the portable testing unit of Fig. 4; and Fig. 6 is a diagrammatic sectional elevation showing another modification of the invention.

Referring particularly to the drawings, Fig. 1 shows a compressed gas cylinder having a body 5, a screw plug 6 screwed into neck 7 to seal the body, and a weighing attachment comprising a tube 8, a float or buoyant member 9 enclosed but freely movable in tube 8, and certain contacts and minor constructional details which will be described later. The cylinder body 5 is of uniform circular cross section on the inside for the greater part of its height, with a conoidal upper end 5a terminating in neck 7. Screw plug 6 is used only when the cylinder is empty; when the gas charge is being forced into or removed from the cylinder a valved plug (not shown) will necessarily replace plug 6.

Formed integrally with or welded to end 5a is a boss 10 which provides a support for tube 8, whose upper extremity has an out-turned flange 8a resting on an annular shoulder 11. A screw plug 12 engages screw threads 13 on the inside of boss 10 and has its lower end clamping flange 8a against shoulder 11. Tube 8 is a straight cylindrical seamless tube, with a number of perforations in its walls, and it may be made of aluminum or magnesium alloy, for maximum lightness. The lower end of tube 8 is slightly spaced from the bottom wall 5b of the cylinder body, so that any fluid or gas in said cylinder body may freely enter the tube. If desired a small screen (not shown) at the lower end of the tube may be employed to prevent scale from the metal walls of the cylinder or other solid particles from entering the guide tube.

The buoyant member or float 9 consists preferably of a metal conoidal tip 15 welded or otherwise secured as at 16 to the upper end of a body 17 formed from a straight hollow metal tube, which may be of aluminum or magnesium alloy. The lower end of tube 17 is closed and sealed by a plug 18 which has a central bore 18a. A pneumatic valve 19 similar to an inner tube valve is screw threaded in a tapped counterbore 20 on the inside of plug 18. Valve 19 and the sealed ends of tube 17 make it possible to charge the interior of the float 9 with gas under fairly high pressure, thereby supporting the thin walls of tube 17 against crushing under the still higher gas pressure in cylinder body 5. After the float has been filled with gas, central bore 18a is closed and sealed by means of a screw cap 21 welded or otherwise sealed as at 22. Instead of a charge of gas inside the float, a number of struts (not shown) may be employed on the inside of the float to obviate collapsing of the thin walls of the tube. As the buoyant member or float must have a certain mean density, its hollow interior permits the addition of small weights (not shown) prior to sealing the lower end, to make its weight correct in spite of small manufacturing variances. It will be understood that a thin walled tube is preferred because thin walls save weight and thus enhance the buoyancy of the float. Any nonporous float having the proper outer cross sectional area at all levels and the proper buoyancy and capable of resisting the stored pressure in the cylinder may be used in lieu of the described float.

The extreme end of the conoidal tip 15 of the float is flattened as indicated at 15a, and just below this flattened extremity a pair of contacts are provided by inserting a resilient straight wire 23 through an aperture formed crosswise of the conoidal tip. Wire 23 should be of good conductivity, and may be brazed or soldered or otherwise fixed so as to be immovable on the float tip 15 but it is resilient so that it may yield or bend laterally when making contact, yet will return to its normal straight shape when the bending moment ceases. A cylindrical contact member 24 made of material of good conductivity is secured on a stud 25 by means of nuts 26, 27, said nuts clamping an insulating washer 28 through which stud 25 passes, also an insulating disk 29 having a boss 29a providing a circular shoulder against which the inturned top flange 24a of the contact member 24 abuts, so that said contact member is centered relative to stud 25 and also relative to the guide tube. Therefore the float is centered or aligned with contact member 24. The total length of wire 23 is greater than the outside diameter of contact member 24, so that both ends of wire 23 will normally contact both edges of contact member 24, whenever the float is lifted sufficiently by its buoyancy in the fluid in the cylinder. Now stud 25 is also a good conductor and it extends through (though is insulated from) screw plug 12 and is electrically connected with a socket contact 30 fixed in said screw plug. A conductor 31 is soldered or otherwise electrically connected with contact member 24 and is passed through though insulated from screw plug 12 to a connection with a second socket 32. To ground the float to the cylinder walls, and to prevent rapid rising and falling or "jiggling" of the float, a spring 33 of good conductivity is fixed at its upper end to the guide tube, and surrounds the conoidal tip 15 of the float to damp movement of the float. If the float is a non-conductor, other arrangements within the skill of a mechanic may be made.

It follows from the above description that when the float rises, it first makes contact with contact member 24, and as the rise continues, it contacts stud 25. If a source of electricity plus an electric light circuit are connected with socket contact 32, with the other side of the circuit grounded for instance on the cylinder body (as will be understood without illustration) the light will be energized whenever the contact wire 23 touches either or both sides of contact member 24. If a second lamp is connected with socket contact 30, it will be illuminated when float tip 15a is in contact with the end of the stud. Two electric lamps, plus a battery and the necessary ground connection, may be provided in a simple portable unit 40 (Figs. 4 and 5) which may have contact prongs 41 adapted to enter socket contacts 30, 32, and a grounding contact 42 secured to the portable unit by a rivet 43, for completing the circuit through the metal walls of the container 5 or 50. A button switch 44 may open and close the circuits of lamps 45 and 46 enclosed in a plastic housing 47. Lamps 45 and 46 may be of two different colors, for instance, red and green. All that a person testing a charged cylinder need do is to momentarily connect such a portable unit with the contacts 30, 32 of each cylinder to be tested, and if one lamp is energized, for example the green lamp, a certain weight of fluid in the cylinder is indicated. This would normally be the lower charging limit. If both lamps are lighted a greater weight of fluid is indicated and the operator will know that the cylinder carries an excess charge. With both lamps dark, the operator will know that the cylinder needs recharging, and he may suitably mark it and pass on to the next cylinder to be tested. Other arrangements of signals and lamps may occur to those skilled in the art of signaling devices.

Where a certain number of cylinders are always used in an installation grouped together in a bank, an electric lamp circuit may be arranged to include respectively similar contacts of all the cylinders in series with a lamp, and if one of the cylinders is insufficiently charged, the lamp in the lower limit circuit will not light, which will indicate that all the cylinders of that particular bank must be tested individually. The lamp may be placed at a remote point, to give immediate indication of a leaking cylinder or cylinders. These and other expedients will readily occur to those skilled in the art of signal circuits and devices.

In the form of the invention shown in Fig. 3, the compressed gas cylinder 50 is of conventional construction, modified only by two tapped bores at its top and bottom to receive the ends of pipes or tubes 51, 52 which connect with the top and bottom of a sealed auxiliary cylinder 53, which acts as a guide tube and container for a float (not shown) exactly like float 9, and having a spring and contacts as previously explained. The top of auxiliary cylinder 53 will have the above described socket connections for a testing device employing lights, or any other convenient means for giving a signal or indication as described above. The fluid in the auxiliary cylinder will subject the float to exactly the same buoyant force which would act if the float were enclosed within the main cylinder 5, as in Fig. 1. The form of the invention shown in Fig. 3 would be desirable if it is intended to weigh the gas in a considerable number of conventional cylinders without undertaking major changes in their constructions, it being necessary only to drill and tap a couple of small holes in each conventional cylinder and then attach the auxiliary cylinder 53 through pipes 51, 52. Both embodiments of the invention may be slightly modified to have one fixed contact below the lower end of the float and another fixed contact above the upper end of the float, with two separate circuits, one closed when the float rests on the bottom of the cylinder (indicating a partly or fully discharged cylinder), and the other closed when the float rises off the cylinder bottom and engages the upper contact (indicating that the cylinder is fully charged). Actual tests show that the described invention will weigh a fluid such as carbon dioxide under high pressure with an error of less than one quarter of one per cent.

An important feature of the present invention is designing the float so that its cross sectional area at any and every level will bear a direct and constant proportion to the total cross sectional area of the fluid in the vessel at that level. Thus the float must have a length substantially equal to the height of the fluid in the cylinder, but its cross section may be anything provided the relationship just explained is preserved. In the form of Fig. 3, the cross sectional area of the fluid in the vessel includes not only the fluid actually in contact with or confined by cylinder 50 but also the fluid in the attachement 53. Expressed mathematically, $$a = k_2 A$$

where $a$ is the area of the float at any level, $A$ is the area of free space in the cylinder (plus the area of the free space in its attachments if any) at the same level, and $k_2$ is a constant. In the above described construction, the mean density of the float should be substantially equal to the charging density at which it is desired to fill the cylinder before obtaining an indication of the lower charging limit.

It is not necessary that the float shall move responsive to the buoyant force. If movement of the float does not take place until after the reading is taken, then no error is introduced by such movement. Another advantage of measuring the buoyant force under any condition of charging is that the amount of fluid in the container may be determined, rather than a mere determination that there is more or less fluid than some predetermined amount. One way of measuring the buoyant force would be to mount an electromagnet a short distance above the float (modified to carry a magnetic armature) and by measuring the amount of current required in the magnet to raise the float thereby determine the force required to raise the float. The buoyant force would be equal to the difference between the weight of the float and the measured force, and would be the buoyant force acting on the float when in its lowest position, with no movement required above that position. In the event the float is not to be moved by the buoyant force of the fluid in the container, its density plus the downward force of any mechanism such as the damping spring must be greater than the buoyant force of the fluid.

In the modified form of Fig. 6, the confining tube 8 encloses a solenoid 55 which is energized by leads 56, 57 leading to a source of electricity 58. The float 9a is like float 9 except that it has a magnetic core 59 secured to its tip and normally within the magnetic field of solenoid 55 when energized. Core 59 is best made of some metal alloy which has substantially no residual magnetism. An insulating block 60 is located below the solenoid and a contact 61 is secured in the insulating block, to close a circuit when the magnetic core 59 touches it. A conductor 62 is connected to contact 61 and to a light or other signal device 63 which may be temporarily connected to a source of electricity not shown. Spring 33 performs the function described above, and in addition completes the circuit for the signal device 63. A power input control 64 permits the operator to control the voltage to the solenoid, hence to vary the strength of its magnetic field. A voltmeter 65 and ammeter 66 will give readings which if taken at the moment before the signal is given, will upon proper calibration give an accurate reading of the buoyant force.

It will be obvious that since gases such as carbon dioxide may and frequently do exist in both gaseous and liquid states simultaneously within the charged container, a float which will give a liquid level indication cannot be used to weigh the total contents of the charged container. With a float designed in accordance with this disclosure, the total buoyant force will be the sum of the buoyant force due to the displaced liquid and the buoyant force due to the displaced gas. If some or all of the liquid passes over into the gaseous state, the total contents of the container will weigh the same, and while the buoyant force due to the liquid present will be less, the buoyant force due to the gas will be more, since the density of the gas will then be increased and the amount displaced will be greater.

According to the Mehlsen Patent No. 680,491 dated August 13, 1901, an indicator and electrical alarm device may be used to indicate at a remote point the depth of water in the hold of a ship and to sound the alarm when the water reaches a certain height. The Hillmer Patent No. 988,342 dated April 4, 1911 and the Roller Patent No. 1,826,024 dated October 6, 1931 both disclose apparatus which will weigh liquids in containers plus the air above the liquids without weighing the containers themselves and without removing the liquids. My invention however is capable of accurately weighing carbon dioxide and similar fluids while under high pressure and while partly liquefied and has a field of usefulness which no previous invention has entered, so far as is known.

What I claim is:

1. In a fluid-containing cylinder adapted to confine a quantity of fluid under pressure, said fluid being capable of existing in a gaseous state, in a liquid state or in both gaseous and liquid states within the cylinder at varying ambient temperatures, apparatus for determining an approximation of the total weight of fluid within the cylinder comprising, a buoyant member within the cylinder and having a length coextensive with and substantially equal to the height of free fluid space in the cylinder, means to limit the buoyant member to movements in the direction of its length, indicating means to give definite responses to the buoyant force acting on the buoyant member for indication of at least two different and predetermined weights of fluid within the cylinder, said indicating means including a plurality of electrical contacts contained within the cylinder, and one of said contacts being carried on the buoyant member and being yieldable under increase of said buoyant force above a predetermined value.

2. In a fluid container adapted to confine a quantity of fluid under pressure, apparatus for indicating the lower and upper charging limits of said container comprising, a buoyant member within the container and having a length coextensive with and substantially equal to the height of the free fluid space in the container, said buoyant member having a cross-sectional area which at every level of the container bears a direct and constant proportion to the cross-sectional area of the fluid space in the container at the same level, means to limit the buoyant member to movement in the direction of its length, indicating means including a pair of electrical contacts fixed to the buoyant member and to the interior wall of the container respectively and responsive to the buoyant force acting on the buoyant member to give a definite response to a predetermined weight of fluid within the container, said indicating means further including an additional electrical contact fixed to the interior wall of the container, and said contact fixed to the buoyant member being yieldable in response to a buoyant force acting on the buoyant member to give an additional response to another and greater predetermined weight of fluid within the container.

3. In a fluid container adapted to confine a quantity of fluid under pressure, appartus for indicating the lower and upper charging limits of said container comprising, a buoyant member within the container and having a length coextensive with and substantially equal to the height of the free fluid space in the container, said buoyant member having a cross-sectional area which at every level of the container bears a direct and constant proportion to the cross-sectional area of the fluid space in the container at the same level, means to limit the buoyant member to movement in the direction of its length, indicating means including an electrical contact fixed to the interior wall of the container of downwardly open cup-shaped form concentric with respect to the buoyant member, an additional electrical contact fixed within the cup-shaped contact above the lower edge thereof, and an electrical contact fixed to the buoyant member comprising a spring arm adapted to engage the lower edge of the cup-shaped contact to give a definite response to a predetermined weight of fluid within the container and also adapted to yield slightly and allow the upper end of the buoyant member to make contact with said additional contact to give an additional response to another and greater predetermined weight of fluid within the container.

4. In a fluid container adapted to confine a quantity of fluid under pressure, apparatus for indicating the lower and upper charging limits of said container comprising, a buoyant member within the container and having a length coextensive with and substantially equal to the height of the free fluid space in the container, said buoyant member having a cross-sectional area which at every level of the container bears a direct and constant proportion to the cross-sectional area of the fluid space in the container at the same level, means to limit the buoyant member to movement in the direction of its length, indicating means including an electrical contact fixed to the interior wall of the container of downwardly open cup-shaped form concentric with respect to the buoyant member, an additional electrical contact fixed within the cup-shaped contact above the lower edge thereof, an electrical contact fixed to the buoyant member comprising a spring arm adapted to engage the lower edge of the cup-shaped contact to give a definite response to a predetermined weight of fluid within the container and also adapted to yield slightly and allow the upper end of the buoyant member to make contact with said additional contact to give an additional response to another and greater predetermined weight of fluid within the container, and electrical circuits including said electrical contacts and two electric lamps to provide said responses and to indicate by lighting of said lamps when the fluid charge within said container has reached said lower and upper limits.

JOHN H. CANTLIN.

REFERENCES CITED

The following references are of record in the file of this patent:

UNITED STATES PATENTS

| Number | Name | Date |
|---|---|---|
| 1,826,024 | Roller | Oct. 6, 1931 |
| 2,053,353 | Talbot | Sept. 8, 1936 |
| 2,413,651 | Petty | Dec. 31, 1946 |

FOREIGN PATENTS

| Number | Country | Date |
|---|---|---|
| 209,494 | Great Britain | 1924 |